United States Patent
Ishido (10) Patent No.: US 8,861,047 B2
(45) Date of Patent: Oct. 14, 2014

(54) DOCUMENT SIZE DETECTOR

(75) Inventor: Katsuhiro Ishido, Abiko (JP)

(73) Assignee: Canon Kabushiki Kaisha, Tokyo (JP)

( * ) Notice: Subject to any disclaimer, the term of this patent is extended or adjusted under 35 U.S.C. 154(b) by 1070 days.

(21) Appl. No.: 12/406,701

(22) Filed: Mar. 18, 2009

(65) Prior Publication Data
US 2009/0237751 A1 Sep. 24, 2009

(30) Foreign Application Priority Data

Mar. 18, 2008 (JP) .................................. 2008-069717
Feb. 23, 2009 (JP) .................................. 2009-039621

(51) Int. Cl.
H04N 1/04 (2006.01)
H04N 1/00 (2006.01)

(52) U.S. Cl.
CPC ....... H04N 1/00681 (2013.01); H04N 1/00734 (2013.01); H04N 1/00708 (2013.01)
USPC ........... 358/488; 358/486; 358/497; 358/474; 358/483; 358/449

(58) Field of Classification Search
CPC .............. H04N 1/00681; H04N 1/193; H04N 2201/00766; H04N 2201/00756; H04N 1/1017; H04N 2201/00731; H04N 2201/00796; H04N 2201/00734
USPC ......... 358/486, 488, 449, 465, 466, 474, 497; 358/482, 483; 382/312, 318, 319; 250/234–236
See application file for complete search history.

(56) References Cited

U.S. PATENT DOCUMENTS

| | | | | |
|---|---|---|---|---|
| 4,929,844 | A | | 5/1990 | Houjiyou et al. |
| 4,954,846 | A | * | 9/1990 | Matsuo et al. .................. 399/51 |
| 5,693,933 | A | | 12/1997 | Takasu et al. |
| 5,905,933 | A | * | 5/1999 | Murai ........................... 399/376 |
| 5,973,797 | A | | 10/1999 | Tanaka et al. |
| 6,952,290 | B2 | * | 10/2005 | Ishido et al. .................. 358/475 |
| 7,471,424 | B2 | | 12/2008 | Ishido et al. |
| 7,864,378 | B2 | * | 1/2011 | Shimizu ........................ 358/474 |
| 8,035,865 | B2 | * | 10/2011 | Ishido et al. .................. 358/449 |
| 2004/0165223 | A1 | | 8/2004 | Ishido et al. |
| 2004/0233478 | A1 | | 11/2004 | Ishido et al. |
| 2007/0273935 | A1 | * | 11/2007 | Ide et al. ....................... 358/474 |
| 2010/0067065 | A1 | * | 3/2010 | Ishido ........................... 358/449 |
| 2012/0092733 | A1 | * | 4/2012 | Ueno et al. .................... 358/475 |

FOREIGN PATENT DOCUMENTS

| | | | |
|---|---|---|---|
| JP | 09-247374 | | 9/1997 |
| JP | 2000-138798 | | 5/2000 |
| JP | 2002-290675 | | 10/2002 |
| JP | 2004-126132 | | 4/2004 |
| JP | 2004-258386 | | 9/2004 |
| JP | 2004-264529 | | 9/2004 |
| JP | 2006-154586 | A | 6/2006 |
| JP | 2007-124319 | A | 5/2007 |
| JP | 2007124319 | A * | 5/2007 |
| JP | 4012093 | B2 | 11/2007 |

* cited by examiner

*Primary Examiner* — Cheukfan Lee
(74) *Attorney, Agent, or Firm* — Canon USA, Inc. IP Division (57) ABSTRACT

A document size detector sets an amount of light to be emitted from a light source for document size detection in accordance with the amount of disturbance light detected by the CCD, switches on the light source so as to make the light source emit the set amount of light, and detects the size of a document placed on a platen. Therefore, erroneous detection of a document size is prevented and glare that a user is subjected to when the size of a document placed on the platen is detected is reduced.

10 Claims, 9 Drawing Sheets

| SIZE IN MAIN SCANNING DIRECTION DETECTED BY CCD 112 | DETECTION RESULT FROM DOCUMENT SIZE DETECTION SENSOR 113 | |
|---|---|---|
| | DOCUMENT PRESENT | DOCUMENT NOT PRESENT |
| B5R, B6 | B5R | B6 |
| A4R, A5 | A4R | A5 |
| B5, B4 | B4 | B5 |
| A4, A3 | A3 | A4 |

DOCUMENT SIZE DETECTOR

BACKGROUND OF THE INVENTION

1. Field of the Invention

The present invention relates to a document size detector, more specifically, optically detecting the size of a document placed on a platen.

2. Description of the Related Art

Existing document size detectors for image forming apparatuses include a type of detector with which a document size is detected before a document pressing plate for pressing a document against a platen is completely closed. For example, Japanese Patent Laid-Open No. 2004-258386 proposes a document size detector that functions as follows. When it is detected that the angle between a platen and a document pressing plate becomes equal to or less than a specified angle, a document illumination light source is switched on and reflected light from the document is read with a charge-coupled device (CCD). The size of the document is detected based on the result of reading by the CCD.

The document size detection is performed by utilizing the difference between an output of the CCD for the region on which a document is placed and an output of the CCD for the region on which the document is not placed. The detection is performed by assuming that a position at which outputs of the CCD differ corresponds to an edge of the document. As described above, in the document size detector disclosed in Japanese Patent Laid-Open No. 2004-258386, the document illumination light source is switched on when the angle between the platen and the document pressing plate becomes equal to or less than a specified angle. At that time, the output of the CCD for the region on which a document is not placed is less than the output of the CCD for the region on which the document is placed. This is because the amount of reflected light from the region on which the document is not placed is less than the amount of reflected light from the region on which the document is placed. This is also because only a small amount of light is reflected from the document pressing plate, since the document pressing plate is open when the document illumination light source is switched on.

The above-described document size detector starts a document size detection process when the angle between the platen and the document pressing plate becomes less than a specified angle at which disturbance light, such as light from interior illumination, negligibly enters the CCD. Thus, for a region on which a document is not placed, disturbance light negligibly enters the CCD, whereby the document size can be detected accurately without interference from disturbance light that might cause erroneous detection.

With this document size detector, a document size has been detected when the document pressing plate becomes closed. Therefore, an image forming apparatus including the document size detector is ready to start image forming as soon as the document pressing plate is closed.

However, the document size detector has a problem in that a user is subjected to glare as light emitted from the light source enters the eyes or the user when a document size is being detected, since the document illumination light source is switched on while the document pressing plate is open.

In order to reduce the amount of glare to which a user is subjected, Japanese Patent Laid-Open No. 2002-290675 discloses a document size detector in which the amount of light emitted from a light source when detecting a document size is less than the amount of light emitted from the light source when reading a document. This document size detector switches on a document illumination light source when the angle between a platen and a document cover (document pressing plate) becomes equal to or less than a specified angle, causes a CCD to receive reflected light from a document placed on a platen, and detects the size of the document based on the light received by the CCD. At this time, the light source is switched on so as to emit an amount of light less than the amount of light used for reading a document. In this way, by lighting the document illumination light source with a reduced amount of light when detecting a document size while the document cover is open, glare that a user is subjected to can be reduced.

However, when the amount of light for detecting document size is reduced as in the document size detector disclosed in Japanese Patent Laid-Open No. 2002-290675, it becomes difficult to discriminate between disturbance light and reflected light from the document, both of which are detected with a document reading sensor (hereinafter referred to as a CCD), in an environment with strong disturbance light. This may cause erroneous detection of a document size.

Figure 13:
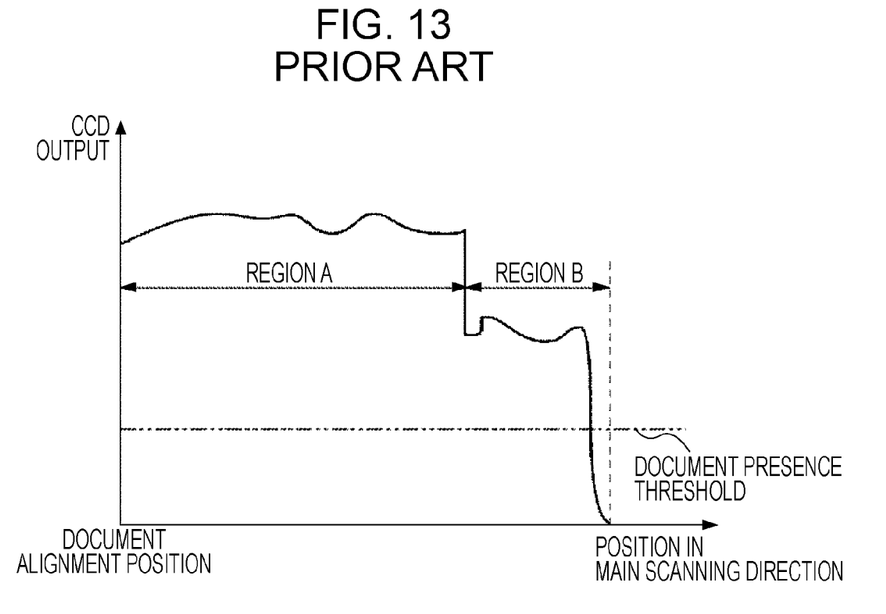
FIG. 13 is a graph showing an electric signal output from the CCD when detecting a document size in an environment with strong disturbance light.

FIG. 13 is a graph showing the output of a CCD when a document size is erroneously detected by a document size detector in a state where, a scanning apparatus including the document size detector, is placed in an environment with strong disturbance light. Region A of the graph shows the output of the CCD resulting from reflected light from a document, and region B shows the output of the CCD resulting from disturbance light. In this case, both the output resulting from disturbance light and the output resulting from reflected light from the document may exceed a predetermined threshold for determining whether a document is present or not (hereinafter referred to as a document presence threshold). If this occurs, a controller of the document size detector may determine that the document is placed also on the region B on which the document is not actually placed, which may result in erroneous detection of the document size.

In order to prevent such erroneous detection of a document size in an environment with strong disturbance light, the amount of light for document size detection can be set so as to be sufficient to exclude the influence of disturbance light. However, this may cause a user to be subjected to glare.

As described, for a document size detector that starts a document size detection while a document pressing plate is open, there is a trade-off between a solution for preventing erroneous detection of a document size and a solution for preventing a user from being subjected to glare. A solution for both problems has not been given to date.

SUMMARY OF THE INVENTION

An embodiment of the present invention, which is achieved against the above-described background, provides a document size detector configured to detect a size of a document placed on a platen comprising an illumination unit configured to emit light onto the platen; a photodetection unit configured to output a signal in accordance with an amount of light to be received; a control unit configured to control the amount of the light emitted from the illumination unit; and a document size detection unit configured to detect the size of a document placed on the platen based on the signal that is output from the photodetection unit in accordance with the amount of reflected light out of the light emitted from the illumination unit, wherein the control unit is configured to control the amount of the light emitted from the illumination unit based on the signal that is output from the photodetection unit in accordance with an amount of light received in a state in which the photodetection unit receives light from an external light source.

Further features of the present invention will become apparent from the following description of exemplary embodiments with reference to the attached drawings.

BRIEF DESCRIPTION OF THE DRAWINGS

FIG. 6 is a graph showing an electric signal output from the CCD detecting disturbance light when the light source is not switched on.

DESCRIPTION OF THE EMBODIMENTS

Hereinafter, embodiments of the present invention are described with reference to FIGS. 1 to 12.

Figure 1A:
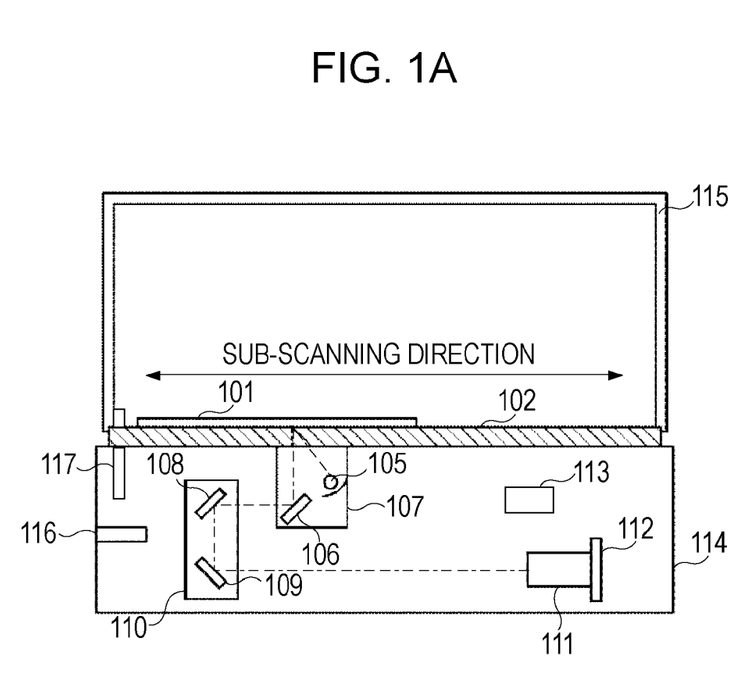
FIG. 1A is a sectional view of a document size detector according to an embodiment of the present invention, taken along a section in a sub-scanning direction.
Figure 1B:
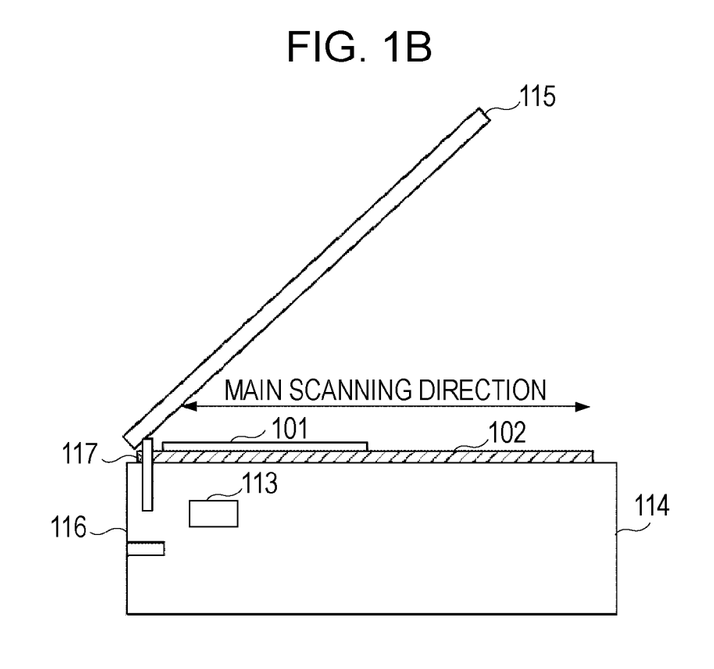
FIG. 1B is a sectional view of a document size detector according to an embodiment of the present invention, taken along a section in a main scanning direction.

FIGS. 1A and 1B show a structure of a scanning apparatus including a document size detector according to a first embodiment. FIG. 1A is a front view, and FIG. 1B is a side view of the scanning apparatus. A document 101 is placed on a platen 102. Hereinafter, the first embodiment of the present invention is described in detail with reference to FIGS. 1 to 12.

Referring to FIG. 1A, the document 101 is placed on the platen 102. A document pressing plate 115 is disposed so as to press the document 101 against the platen 102. A surface of the document pressing plate 115 facing the platen 102 is colored white (a white plate is disposed) so that the surface does not affect the reading of the document 101.

An optical sensor 116 and a sensor flag 117 detect the open state of the document pressing plate 115 with respect to the platen 102 (an open state detection section). The sensor flag 117 is moved up and down when the document pressing plate 115 is opened and closed. Light from the optical sensor 116 is cut off in accordance with the up-and-down movements of the sensor flag 117, whereby the optical sensor detects whether the open angle of the document pressing plate 115 is equal to or smaller than a specified angle. When the open angle becomes equal to or smaller than the specified angle, a document size detection process is started (described in detail below).

A light source 105 emits light onto the document 101 placed on the platen 102. The light source 105 is configured such that the amount of light emitted therefrom can be controlled. As shown in FIG. 1A, the light source 105 is disposed in an optical bench 107 that is movable in a sub-scanning direction (a first direction) along the platen 102. The first direction is shown by an arrow in FIG. 1A. A sub-scanning direction document size detection sensor 113 (hereinafter referred to as a document size detection sensor 113) is disposed in a specified position in a housing 114. The document size detection sensor 113 outputs a binary value indicating whether or not the document is equal to or smaller than a specified size.

A CCD 112 is a CCD line sensor (photodetector) disposed parallel to a surface of the platen 102 on which a document is placed. The CCD 112 outputs a signal in accordance with an amount of light received. The length of the CCD extends in a main scanning direction (a second direction that is perpendicular to the first direction). When reading the document 101, the CCD 112 receives reflected light from the document 101 onto which light is emitted from the light source 105. The CCD 112 outputs an electric signal in accordance with the amount of light received. Light emitted from the light source 105 onto the document 101 is reflected from the surface of the document 101. Light reflected from the document 101 is guided to a lens 111 via mirrors 106, 108, and 109, and collected by the lens 111 to the CCD 112. When a document is read, the optical bench 107, which includes the CCD 112, and an optical bench 110 are moved in the sub-scanning direction, whereby the CCD 112 reads an image of the document 101. Image data read by the CCD 112 is output to an image forming apparatus (not shown), where an image for the data is formed on a recording sheet.

Figure 2:
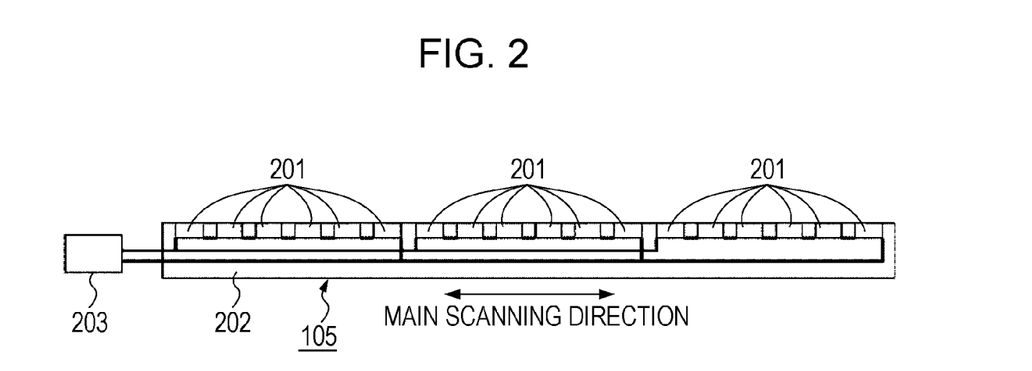
FIG. 2 is an example of an arrangement of LED light sources included in the document size detector.

FIG. 2 is a sectional view of the light source 105. As shown in the figure, light-emitting diodes (LEDs) 201 are supported by a substrate 202 and arrayed in the main scanning direction. The LEDs are divided into groups and controlled on a group basis. The amount of light emitted from the LEDs is adjusted by changing an input signal. An LED light source is more suitable for the light source of this embodiment than, for example, a xenon tube or a fluorescent lamp, because the amount of light emitted by LEDs can be easily controlled. A scanner controller 203 shown in FIG. 2 is a control unit that controls an amount of light from the light source 105.

Figure 3:
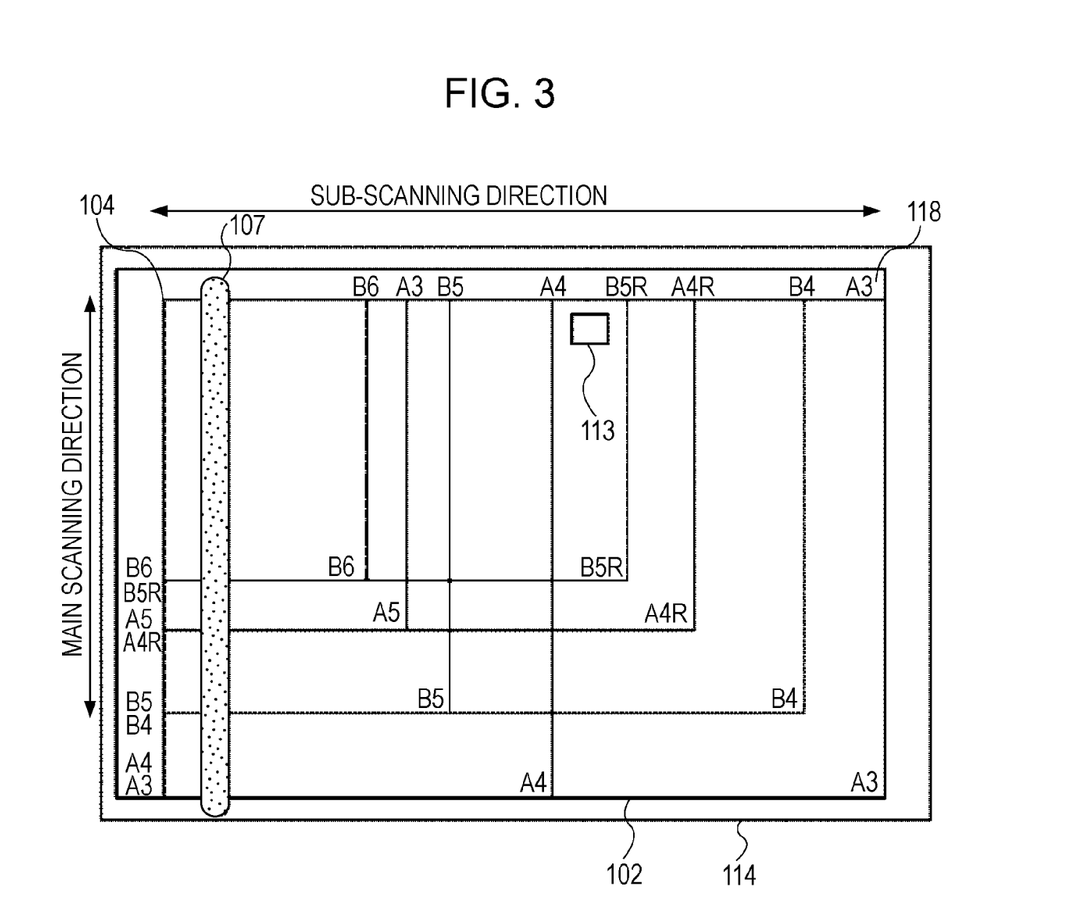
FIG. 3 is a view showing a configuration of a platen of the document size detector and the position of a CCD when detecting a document size.

FIG. 3 is a top view showing a configuration of the platen 102 of the image scanning apparatus including the document size detector according to the first embodiment. As shown in the figure, a document size label 118 is disposed in the periphery of the platen 102. As shown in the upper left side of the figure, a document alignment mark 104 is disposed in a position with which edges of a document are aligned. A standard-sized document is placed on the platen 102 so as to be aligned with the document size label 118 and the document alignment mark 104. Documents of various sizes can be placed on the platen 102 as shown in FIG. 3.

While a document size is being detected, the optical bench 107 is located in a position shown in FIG. 3. This position is a home position of the optical bench 107. By locating the optical bench 107 in the home position while a document size is being detected, the length of the document, which is placed so as to be aligned with the document alignment mark 104, in the main scanning direction can be detected. Moreover, by detecting a document size while the optical bench 107 is in the home position, a document reading operation can be started immediately after the document size is detected.

As shown in FIG. 3, a sub-scanning direction document size detection sensor 113 is disposed in a specified position in the housing 114. The document size detection sensor 113 outputs a binary value indicating whether or not the document is equal to or smaller than a specified size. The document size detection sensor 113 serves to narrow down candidate sizes of the document 101 placed on the platen 102. That is, when a user places a document in alignment with the document size label 118 and the document size detection sensor 113 detects that the document is present, the size of the document is determined to be one of B5R, A4R, B4, and A3 (see the correspondence table in FIG. 4). When the document size detection sensor 113 detects that a document is not present, the size of the document is determined to be one of B6, A5, B5, and A4.

Figure 5:
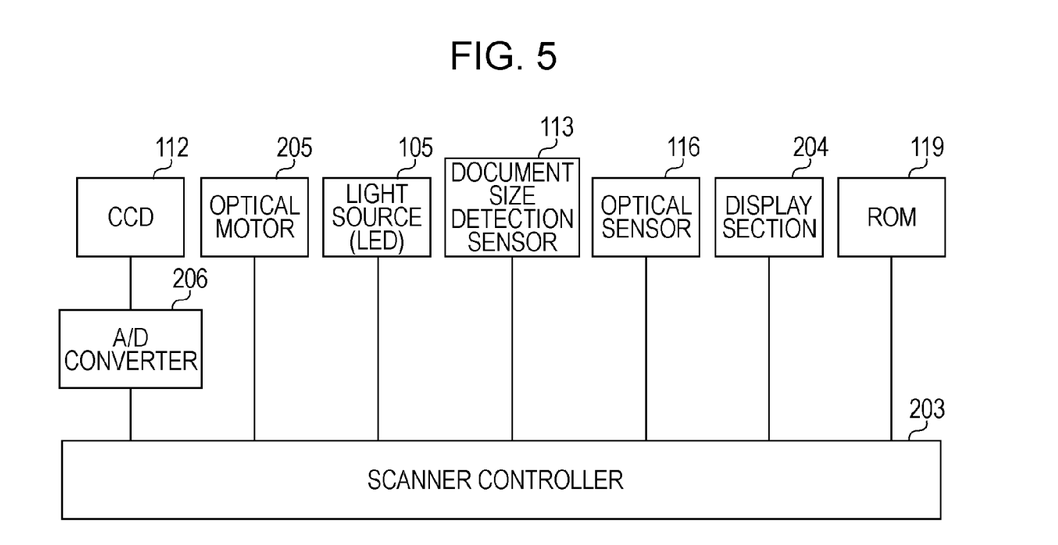
FIG. 5 is a block diagram of the document size detector according to the embodiment.

FIG. 5 is a block diagram showing a configuration of a control system of the document size detector according to the embodiment. The scanner controller 203 shown in FIG. 5 is a control unit that controls the light source 105, the CCD 112, the document size detection sensor 113, the driving of an optical motor 205, the optical sensor 116, a display section 204, and an A/D converter 206. The scanner controller 203 can switch the light source 105 on or off and desirably control the amount of light emitted from the light source. The scanner controller 203 can make the CCD 112 perform a reading operation, regardless of whether or not the light source 105 is switched on. The scanner controller 203 determines the size of a document based on an output from the CCD 112 and a detection result of the document size detection sensor 113.

A ROM 119 stores a program for executing a control flow performed by the scanner controller 203 as described below. The optical motor 205 moves the optical benches 107 and 110 in the main scanning direction when a document is being read. The movement amount of the optical motor 205 is controlled by the scanner controller 203.

The scanner controller 203 detects disturbance light via the CCD 112, sets a document presence threshold in accordance with the disturbance light detected, and controls the amount of light emitted from the light source 105 when detecting a document size. In this embodiment, disturbance light refers to the light that enters the CCD 112 from outside the scanning apparatus.

Figure 6:
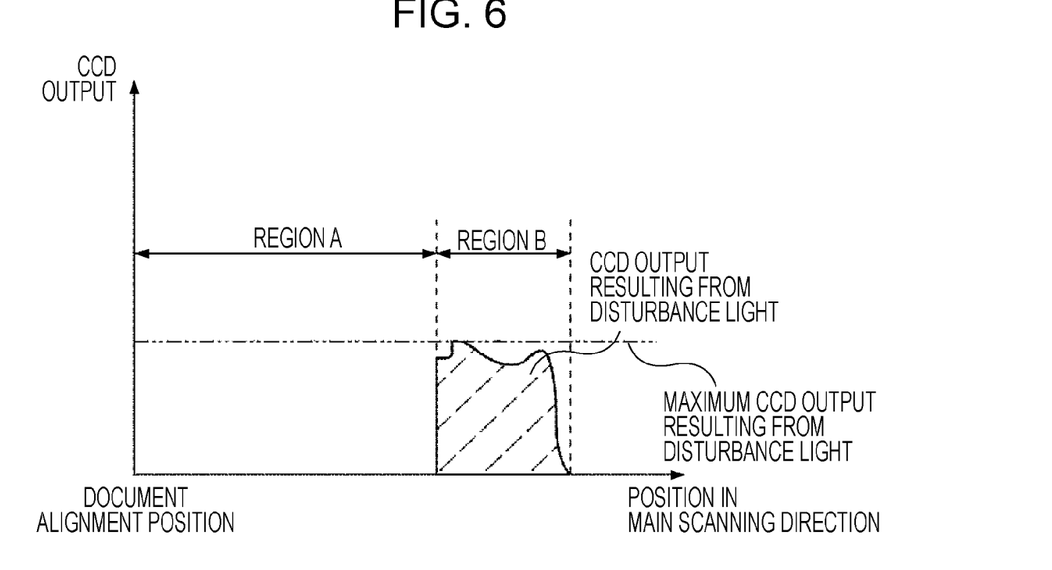

The scanner controller 203 makes the CCD 112 start reading when the light source 105 is not switched on (in an unlit state). FIG. 6 shows an example of a detection result. The document 101 is placed on region A in the main scanning direction shown in FIG. 6. In region A, output of the CCD 112 resulting from disturbance light is low, because disturbance light is blocked by the document. On the other hand, in region B, an output resulting from disturbance light is produced (as shown by a hatched area in the figure), because the CCD 112 detects the disturbance light. The maximum value of this output is set to be the amount of disturbance light (shown by a two-dot chain line in FIG. 6).

In accordance with the amount of disturbance light, the scanner controller 203 sets the document presence threshold. Disturbance light may include light from a light source such as a fluorescent lamp whose amount periodically changes. When the amount of disturbance light periodically and slightly changes between a minimum and a maximum, it may happen that the amount of disturbance light when detecting the disturbance light is the minimum and the amount of disturbance light when detecting a document size is the maximum. In order to prevent erroneous detection of a document size even in such a case, the document presence threshold is set to be equal to (or larger than) a value for which fluctuations in the amount of disturbance light (from a fluorescent lamp or the like) are added to a maximum output level resulting from disturbance light.

The amount of light emitted from the light source 105 when a document size is detected is further described in detail. The scanner controller 203 sets the amount of light emitted from the light source 105 such that the output level of the CCD 112 that receives the light emitted from the light source 105 and reflected by the document 101 is at least higher by a specified amount than the document presence threshold. With this setting, the amount of reflected light from a document when detecting a document size is larger than the amount of disturbance light and the set threshold, whereby erroneous detection due to the disturbance light is prevented.

Thus, the amount of light to be emitted is set at an amount with which the scanner controller 203 does not erroneously detect a document size due to disturbance light when the light source 105 is switched on for document size detection, and with which glare that a user is subjected to is reduced as much as possible. When the amount of disturbance light is large, the amount of light emitted from the light source 105 is increased so as to detect a document size. In this case, it is not likely that a user is subjected to glare due to the increased amount of light emitted from the light source 105, because the user's eyes have been adjusted to the amount of disturbance light.

Figure 7:
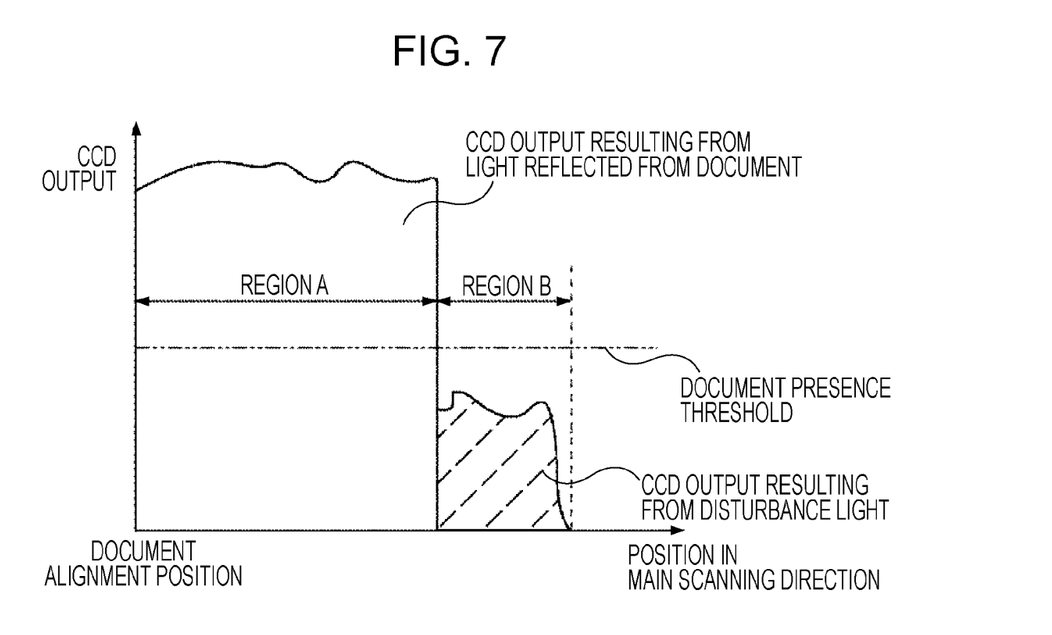
FIG. 7 is a graph showing an electric signal output from the CCD when the light source is switched on so as to emit an amount of light that has been set.

Next, a method for detecting a document size with a set amount of light, which is, in other words, a method for detecting a document size in the main scanning direction based on a detection result from the CCD 112, is described. The scanner controller 203 makes the light source 105 emit the set amount of light and detect the document size. FIG. 7 is a graph showing an output of the CCD 112 when the light source 105 is switched on so as to detect the document size. Region A corresponds to a region on which a document is placed. The output in region A corresponds to an output of the CCD 112 that receives reflected light from the document. Region B corresponds to a region on which the document is not placed. The output in region B corresponds to an output of the CCD 112 that receives disturbance light.

As described above, since the amount of light emitted from the light source 105 is set such that the output of the CCD 112 resulting from reflected light from the document is higher than the document presence threshold, the output of the CCD 112 for the region on which a document is placed is higher than the document presence threshold. Moreover, since the document presence threshold is set at a level higher than the amount of disturbance light, output of the CCD 112 due to disturbance light is lower than the document presence threshold.

A document size in the main scanning direction is detected by comparing the document presence threshold with the output of the CCD 112 when the light source 105 is switched on so as to emit a set amount of light. To be specific, the scanner controller 203 determines that a document is placed on a region where an output exceeding the document presence threshold is produced. Moreover, the scanner controller 203 determines the document size in the main scanning direction based on the length of the region or the position of a border between a region where the output exceeds the document presence threshold and a region where the output falls below the document presence threshold. For example, as shown in FIG. 7, the value of the electric signal in region A exceeds the document presence threshold, and the value of the electric signal in region B falls below the document presence threshold. The scanner controller 203 determines the document size in the main scanning direction based on the length of the region A where the output exceeds the document presence threshold.

Alternatively, since the border between region A and region B is distinct as shown in FIG. 7, the document size in the main scanning direction may be determined based on the position of the border (edge).

Figure 8:
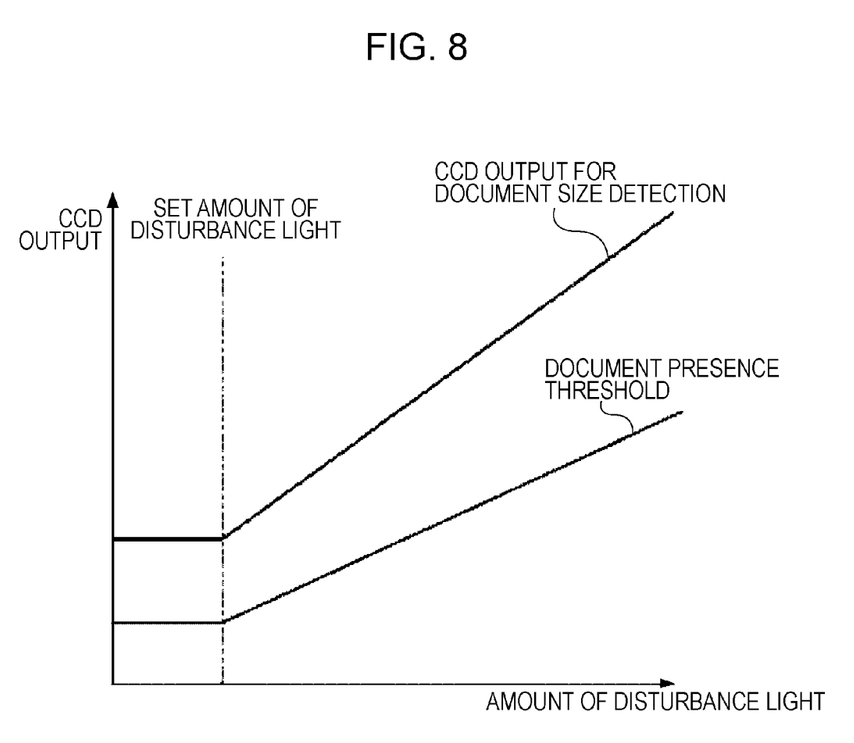
FIG. 8 is a graph showing a relationship among an amount of disturbance light, an amount of light emitted from the light source, and a document presence threshold.
Figure 9:
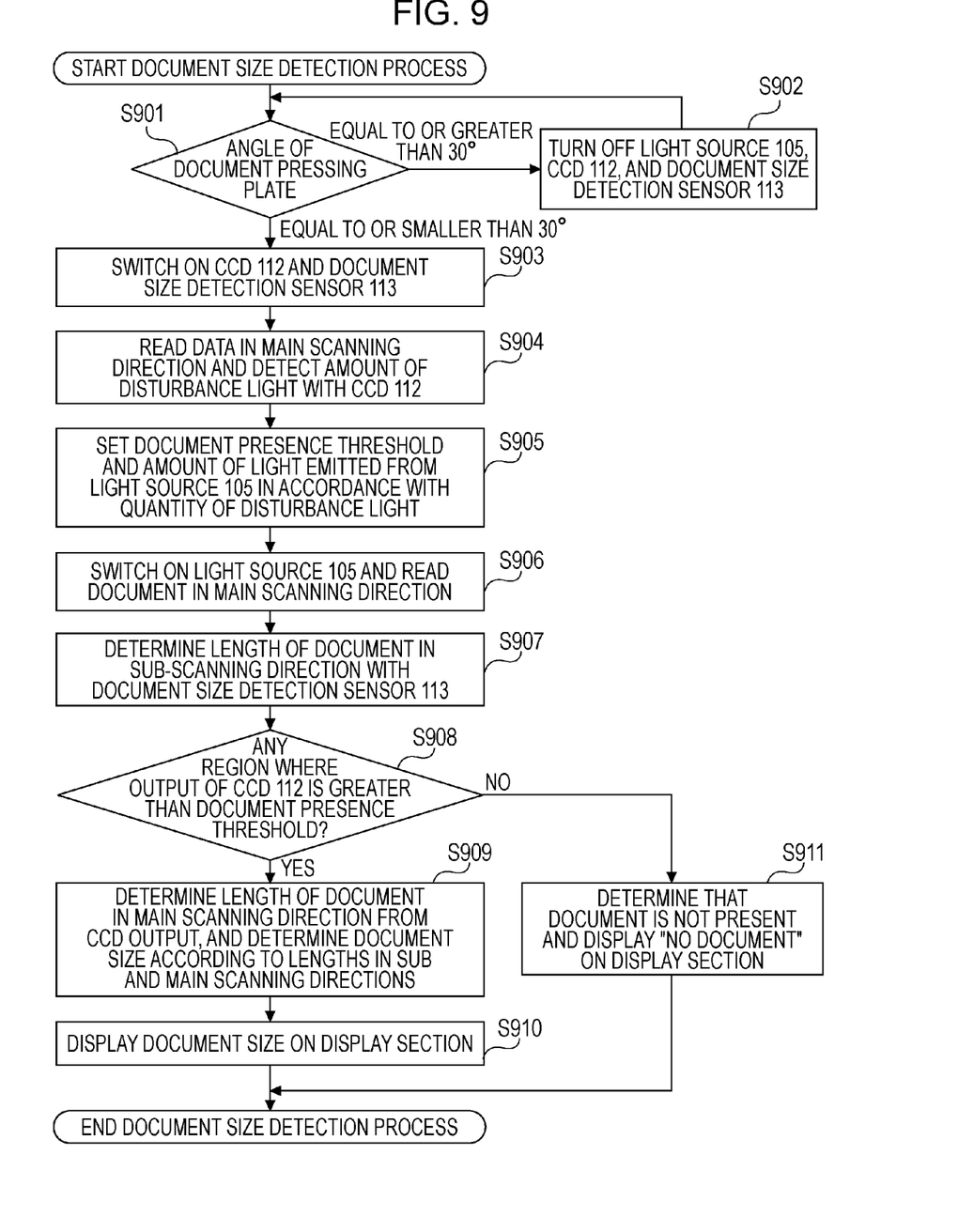
FIG. 9 is a flowchart of a document size detection process by the document size detector according to the embodiment.

FIG. 8 is a graph showing a relationship among an electric signal output from the CCD 112 that receives disturbance light while the light source 105 is not switched on, the amount of light emitted from the light source 105 that is set based on the electric signal, and the document presence threshold. When the amount of disturbance light detected by the CCD 112 is greater than a specified value (a region on the right side of the two-dot chain line in the figure), the scanner controller 203 increases the amount of light emitted from the light source 105 and the value of the document presence threshold in accordance with the increase in the amount of disturbance light. When the amount of disturbance light is less than a specified value, the scanner controller 203 switches on the light source so as to make the light source 105 emit a specified amount of light and detects a document size (described below in detail). The specified value is stored in the ROM 119. Referring to FIG. 9, the flow of a document size detection process performed by the scanner controller 203 is described below.

First, the scanner controller 203 of the document size detector determines the open state (open angle) of the document pressing plate 115 with respect to the platen 102 (S901) based on whether the sensor flag 117 has passed the optical sensor 116. When the open angle becomes less than a specified angle, document size detection is started. In this embodiment, a case in which the specified angle is set to be 30° is described.

Figure 10:
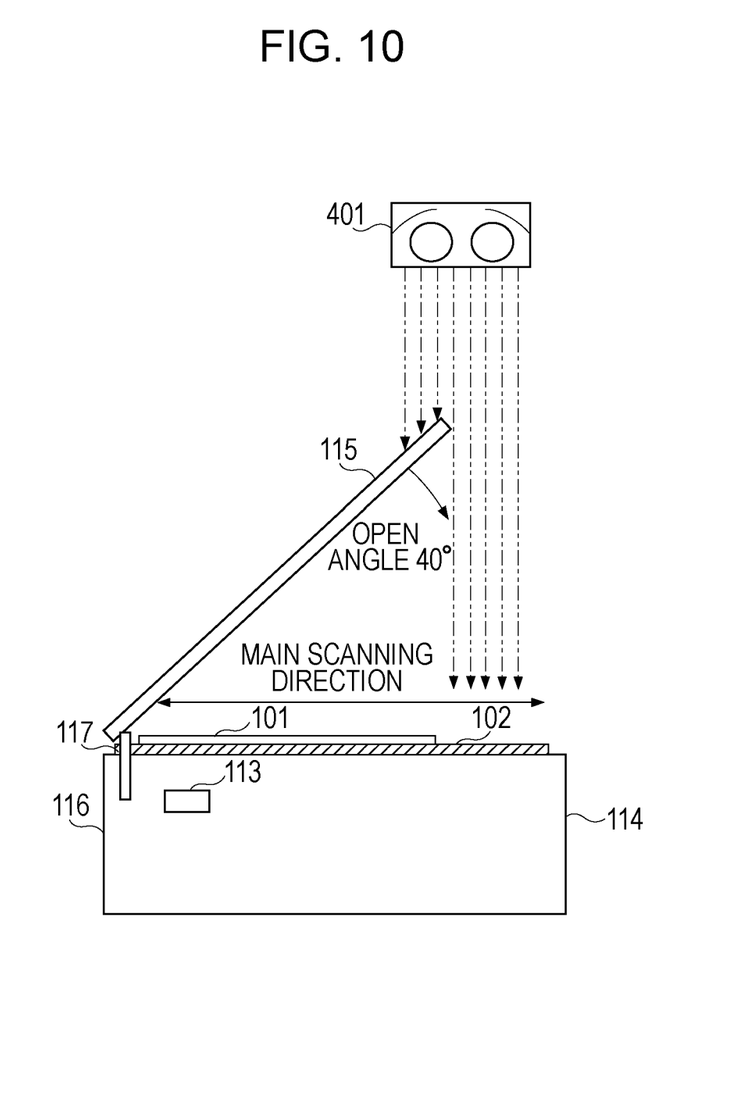
FIG. 10 is a schematic view showing a relationship between an open state of a document pressing plate (at an angle of 40°) and entrance of disturbance light into a housing.

When it is detected that the open angle of the document pressing plate 115 is equal to or more than 30° (the state shown in FIG. 10), the scanner controller 203 switches off the power for the light source 105, the CCD 112, and the document size detection sensor 113 so as to save energy (S902).

Figure 11:
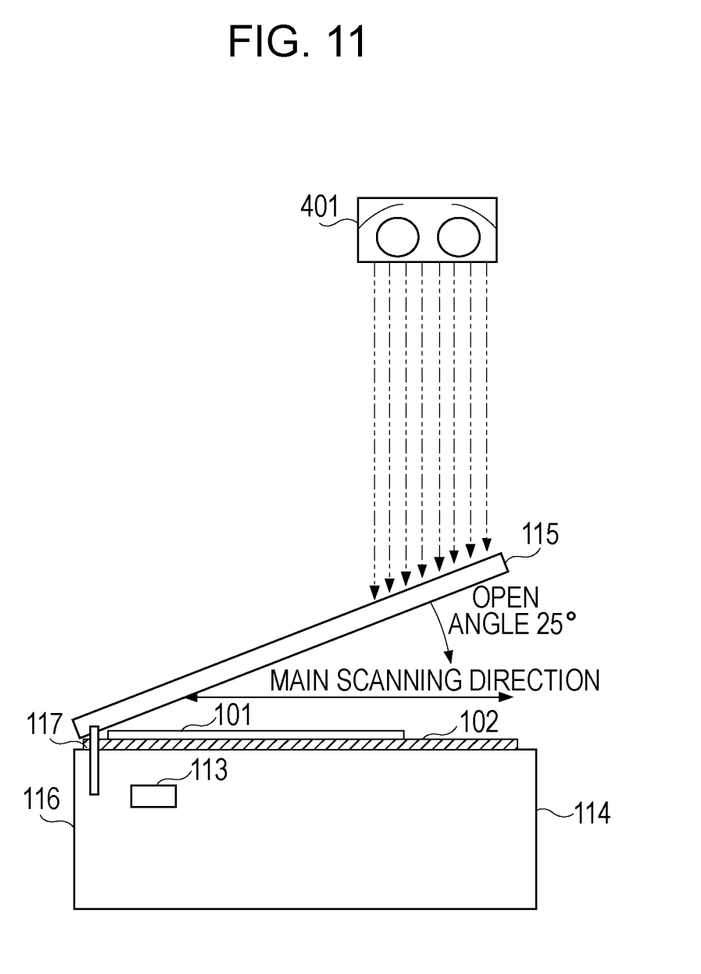
FIG. 11 is a schematic view showing a relationship between an open state of the document pressing plate (at an angle of 25°) and entrance of disturbance light into the housing.

Next, when it is detected that the sensor flag 117 has passed the optical sensor 116, the optical sensor 116 determines that the open angle of the document pressing plate 115 has changed from a range of equal to or more than 30° to a range of equal to or less than 30° (the state shown in FIG. 11). In response, the scanner controller 203 determines that a user of the apparatus is closing the document pressing plate 115, and switches on the power for the CCD 112 and the document size detection sensor 113 (S903). The light source 105 is not switched on in step S903.

The scanner controller 203 causes the CCD 112 to start reading light from an external light source 401 (for example, fluorescent lamp) when the open angle of the document pressing plate 115 changes from a range of equal to or more than 30° to a range of equal to or less than 30° (S904). In accordance with the result of the reading, the CCD 112 outputs an electric signal. It is assumed that light detected by the CCD 112 in this state is disturbance light. Disturbance light refers to light that enters the housing 114 from outside the housing 114, which is emitted from a light source other than the light source 105 such as a room lamp described below.

Subsequent to step S904, the scanner controller 203 converts the electric signal to a digital signal with the A/D converter 206, and sets the maximum value of the signal distribution in the main scanning direction as the amount of disturbance light. Then, the scanner controller 203 sets a document presence threshold in accordance with the set amount of disturbance light. Based on the document presence threshold, the scanner controller 203 determines the amount of light emitted from the light source 105 (S905).

Next, the scanner controller 203 switches on the light source 105 so as make the light source 105 emit the amount of light determined in step S905 and makes the CCD 112 to perform a reading operation (S906). The document size detection is started when it is detected that the open angle of the document pressing plate 115 becomes equal to or less than an angle (25°, for example) that is less than the angle (30° as described above) at which detection of the disturbance light is started. The optical sensor 116 detects whether the open angle is equal to or less than 25° (a sensor flag corresponding to 25° is not shown in the figures). An electric signal output from the CCD 112 in accordance with the result of the reading is converted to a digital signal with the A/D converter 206 and input to the scanner controller 203.

Subsequent to step S906, the scanner controller 203 determines the length of the document in the sub-scanning direction based on a binary output signal from the document size detection sensor 113 (S907).

The scanner controller 203 determines whether the output of the CCD when the light source 105 is switched on is equal to or greater than the document presence threshold. Based on the result of this determination, the scanner controller 203 determines whether the document 101 is placed on the platen 102 (S908). The scanner controller 203 determines that reflected light from the document enters the CCD 112 in a region where an output is greater than the document presence threshold, and determines that a document is placed on the region. In contrast, the scanner controller 203 determines that reflected light from the document does not enter the CCD 112 in a region where an output is equal to or less than the document presence threshold, and determines that a document is not placed on the region.

As described above, an output of the CCD 112 exceeds the document presence threshold when the document 101 is placed on the platen 102. The scanner controller 203 determines the length of the document in the main scanning direction based on the length of the region where the signal exceeds the document presence threshold (S909).

Figure 4:
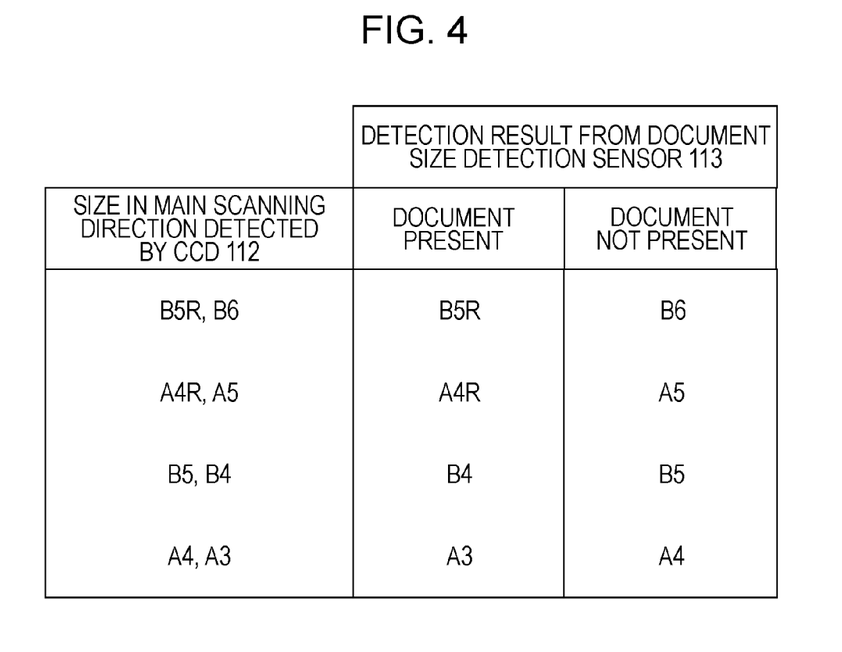
FIG. 4 is a table showing correspondence between detection results and document sizes.

Moreover, in step S909, the scanner controller 203 determines the document size based on the detected length of the document in the sub-scanning direction, the length of the document in the main scanning direction that is determined from the output of the CCD 112, and the correspondence table in FIG. 4.

The scanner controller 203 displays the document size on the display section 204 so as to notify the user of the determination result (S910), and terminates the document size detection process.

On the other hand, an electric signal resulting from disturbance light is output when a document is not placed. However, since the open angle of the document pressing plate 115 is small, disturbance light negligibly enters the document size detector from outside the detector, and most of reflected light from the white surface of the document pressing plate 115 is reflected toward the outside of the detector and negligibly enters the CCD 112. Moreover, since the document presence threshold is set with consideration for disturbance light, the output of the CCD 112 exceeding the document presence threshold is not detected when a document is not placed.

In step S907, when the scanner controller 203 determines that a document is not placed on the platen 102, the scanner controller 203 displays on the display section 204 a message that a document is not present so as to notify a user of the detection result (S911).

Here, a case in which the amount of disturbance light is less than a specified value (a region on the left side of the two-dot chain line in FIG. 8) is described. This corresponds to a case in which a document of A4 or A3 size (Japan Industrial Standard) is placed on the platen 102 or to a case in which document size detection is carried out in a dark room. When the document 101 of A4 or A3 size is placed on the platen 102, the document is placed over the entire width in the main scanning direction (see FIG. 3). A case when the amount of disturbance light is less than a specified value refers to a case in which the amount of disturbance light is plotted in a region on the left side of the two-dot chain line in FIG. 8. In this case, since the disturbance light is blocked by the document, only a small amount of light that passed through the document is detected. When the document 101 is a thick sheet or the like, disturbance light is not detected since light cannot pass through the document. If, in such a case, the amount of light emitted from the light source 105 for document size detection is set in proportion to the amount of disturbance light as in the case where the amount of disturbance light is greater than a specified value, the document size cannot be detected. That is, when the amount of light emitted from the light source 105 is set at a small amount in accordance with the amount of weak disturbance light, the amount of light emitted from the light source 105 may not be sufficient for detecting a document size.

When the amount of disturbance light is less than a specified value as described above, the scanner controller 203 sets the amount of light emitted from the light source 105 at a specified value, and sets the document presence threshold at a specified value. In this case, the amount of light emitted from the light source 105 is set at a value at least greater than the document presence threshold. This is a measure against an increase of noise ratio in the output of the CCD 112 when an amount of light is insufficient. With this measure, erroneous detection of a document size resulting from noise is prevented.

The document size is detected by comparing the output from the CCD 112 with the document presence threshold as in the above-described method.

As heretofore described, the document size detector of this embodiment sets the amount of light emitted from the light source 105 for document size detection in accordance with an electric signal output from the CCD 112 when the light source 105 is not switched on. With the document size detector of this embodiment, the occurrence of erroneous detection of the document size is reduced. Moreover, with the document size detector of this embodiment, a user is not subjected to so much glare even when light emitted from the light source 105 enters the eyes of the user when a document size is being detected.

This document size detector is included in a scanning apparatus. Reading of a document is started when the size of the document is displayed on a display section and a user instructs the scanning apparatus to start reading. The document is read by moving the optical bench 107 from the home position in the sub-scanning direction and causing the CCD 112 to receive reflected light from the document in a state that the light source 105 is switched on so as to emit an amount of light for reading a document (a predetermined amount of light for reading a document). Movement amount of the optical bench 107 in the sub-scanning direction is controlled in accordance with the detected document size, and a recording sheet corresponding to the detected document size is selected by the image forming apparatus.

In this embodiment, the CCD 112 for reading a document is used for detecting disturbance light. However, a sensor different from the CCD 112 may be disposed so as to detect disturbance light.

Instead of using the document size detection sensor 113, a document size may be detected by moving the optical bench 107 from the home position in the sub-scanning direction. That is, after the document size detection process in the main scanning direction described above for the embodiment is over, the optical bench 107 is moved in the sub-scanning direction while the light source 105 is switched on so as to emit a controlled amount of light, and the CCD 112 is caused to receive reflected light from the document. The scanner controller 203 detects the document size in the sub-scanning direction in accordance with reflected light from the document, and determines the document size from the detected document size in the main scanning direction and the detected document size in the sub-scanning direction.

Figure 12:
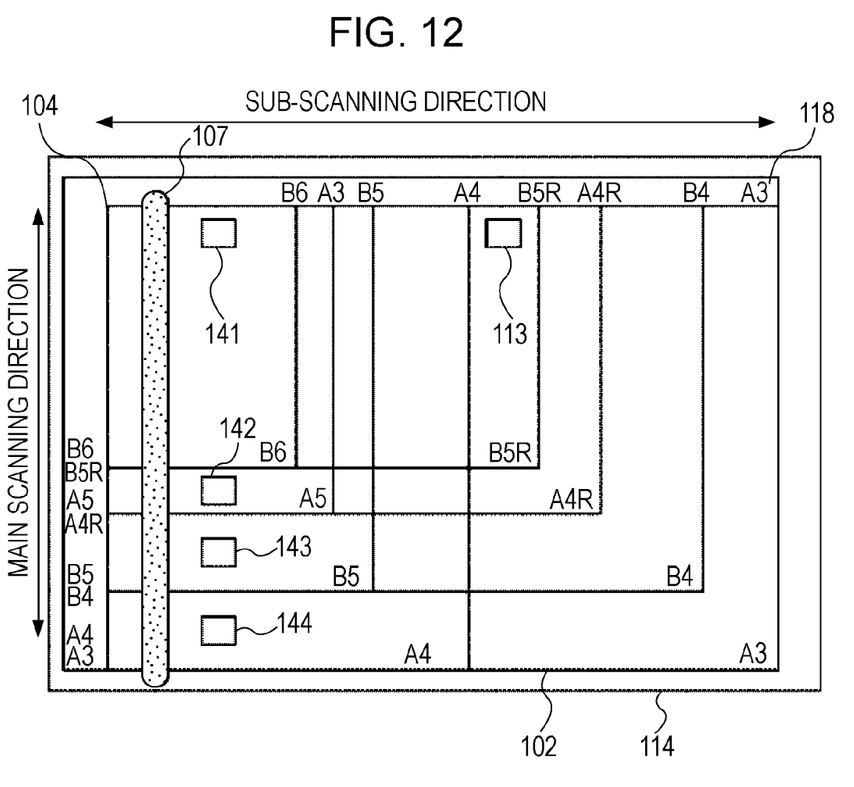
FIG. 12 is a view showing an arrangement of sensors in a document size detector having the sensors for detecting whether a document is present.

Heretofore, the CCD 112 is described as an example of a sensor for detecting disturbance light and the document size. However, a plurality of sensors 113, 141, 142, 143, and 144 shown in FIG. 12 may be disposed for detecting the document size. In this case, the sensors 113, 141, 142, 143, and 144 detect disturbance light, and the amount of light emitted from the light source 105 is controlled in accordance with the amount of detected disturbance light. In this case, either the maximum or average value of the amounts of light detected by the sensors may be used as the amount of disturbance light.

In the embodiment, a configuration in which the CCD 112 is made to detect disturbance light in a state in which the light source 105 is not switched on is described. However, the light source 105 may be switched on in a state in which the CCD 112 receives disturbance light. In this case, the amount of light emitted from the light source 105 is controlled based on an output that is output from the CCD 112 in accordance with an amount of light received by the CCD 112 in the state in which the CCD 112 receives the disturbance light.

It should be apparent that the present invention is realized by providing a storage medium, which stores program code for implementing the functions of the above described embodiment, to a system or an apparatus including a computer (a CPU, an MPU or the like) that reads the program code from the storage medium and executes the program code.

In this case, the program code read from the storage medium implements the functions of the above-described embodiment, and the storage medium storing the program code constitutes the present invention. Any media that can store program code can be used as the storage medium for providing the program code. Examples of such media include a RAM, an NV-RAM, a floppy (registered trademark) disk, a hard disk, an optical disk, a magneto-optical disk, a CD-ROM, a CD-R, a CD-RW, a DVD (a DVD-ROM, a DVD-R, a DVD-RW, etc.), magnetic tape, a non-volatile memory card, and a ROM. Alternatively, the program code may be downloaded via a network.

Moreover, it should be apparent that the functions of the above-described embodiment are realized not only by executing the program code read by a computer, but also by executing, in accordance with the instructions of the program code, a part or all of the actual processing using an operating system (OS) or the like running on the computer.

Furthermore, it should be apparent that the functions of the above-described embodiment are realized by reading the program code from the storage medium, writing the program code to a memory of a function expansion board disposed in a slot of the computer or a function expansion unit connected to the computer, and executing a part or all of the actual processing with a CPU or the like of the function expansion board or unit.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Applications No. 2008-069717, filed Mar. 18, 2008, and No. 2009-039621, filed Feb. 23, 2009, which are hereby incorporated by reference herein in their entirety.

What is claimed is:

1. A document size detector configured to detect a size of a document placed on a platen, comprising:
   an illumination unit configured to emit light onto the platen;
   a photodetection unit configured to output a signal in accordance with a received light amount;
   a determination unit configured to determine an amount of light emitted by the illumination unit that is switched on when a size of a document placed on the platen is detected, based on the signal that is output from the photodetection unit in a state which the photodetection unit receives light from an external light source,
   wherein the determination unit determines the amount of light emitted by the illumination unit that is switched on based on the signal that is output from the photodetection unit in a state in which the photodetection unit receives light from an external light source while the illumination unit does not emit the light; and
   a document size detection unit configured to detect the size of a document placed on the platen based on the signal that is output from the photodetection unit under the illumination unit that is emitting the determined amount of light.

2. The document size detector according to claim 1, wherein the document size detection unit sets a threshold for detecting the size of the document at a value higher than a value of the signal output from the photodetection unit in the state in which the photodetection unit receives the light from the external light source, and the determination unit determines the amount of light emitted by the illumination unit that is switched on in such a way that the value of the signal output from the photodetection unit is higher than the threshold when the photodetection unit receives the reflected light from the document placed on the platen under the illumination unit that is emitting the determined amount of light, and
   wherein the document size detection unit detects the size of the document from the threshold and the signal output from the photodetection unit corresponding to the reflected light from the document placed on the platen.

3. The document size detector according to claim 2, wherein the determination unit determines a predetermined amount as the amount of light emitted by the illumination unit that is switched on if the signal output from the photodetection unit in the state in which the photodetection unit receives the light from the external light source is equal to or less than a predetermined value.

4. The document size detector according to claim 1 further comprising:
   a document length detection unit configured to detect whether a length of the document in a first direction is equal to or less than a specified length, the document being placed on a surface of the platen, the first direction and a second direction being parallel to the surface and perpendicular to each other,
   wherein the photodetection unit is a line sensor having a length extending in the second direction and receives a reflected light from the document placed on the platen, and
   wherein the document size detecting unit detects the size of the document based on the signal output from the photodetection unit and a detection result of the document length detection unit.

5. The document size detector according to claim 1 further comprising:
   a document pressing plate configured to press the document against the platen; and
   an open state detection unit configured to detect whether an angle between the platen and the document pressing plate is less than a specified angle,
   wherein the control unit determines, when the open state detection unit detects that the angle between the platen and the document pressing plate becomes less than the specified angle, the amount of light to be emitted by the illumination unit when the document size detecting unit detects the size of the document.

6. The document size detector according to claim 1, wherein the amount of light determined by the determination unit is larger in a case where a value of a signal corresponding to the external light source is a first value than in a case where the value of the signal corresponding to the external light source is a second value.

7. A document reading apparatus configured to read a document placed on a platen, the document reading apparatus comprising:
   a document pressing plate configured to press the document against the platen;
   an illumination unit configured to emit light onto the platen;
   a photodetection unit configured to output a signal in accordance with a received light amount;
   a determination unit configured to determine an amount of light to be used for detecting a size of the document and emitted by the illumination unit based on the signal outputted from the photodetection unit while the illumination unit does not emit the light; and
   a document size detection unit configured to detect the size of the document placed on the platen based on the signal outputted from the photodetection unit while the illumination unit is emitting the determined amount of light,
   wherein the determination unit is configured to determine that the determined amount of light is a third amount in a case where an amount of light from an external light source to be received by the photodetection unit is a first amount, and to determine that the determined amount of light is a fourth amount smaller than the third amount in a case where the amount of light from the external light source is a second amount smaller than the first amount.

8. The document reading apparatus according to claim 7, wherein the document size detection unit is configured to detect the size of the document based on a result of comparing the signal outputted from the photodetection unit while the illumination unit is emitting the determined amount of light with a threshold value,
   wherein the determination unit is configured to set the threshold value to a value higher than a value of the signal outputted from the photodetection unit while the illumination unit does not emit the light, and wherein the determination unit is configured to determine the amount of light emitted by the illumination unit so that the value of the signal to be output from the photodetection unit is higher than the threshold value by receiving light reflected by the document placed on the platen.

9. The document reading apparatus according to claim 7, wherein the determination unit is configured to acquire the signal from the photodetection unit while the illumination unit does not emit the light in response to an angle between the platen and the document pressing plate becoming a first angle, and wherein the determination unit is configured to acquire the signal from the photodetection unit while the illumination unit is emitting the light in response to the angle between the platen and the document pressing plate becoming a second angle smaller than the first angle.

10. The document reading apparatus according to claim 7, wherein the determination unit is configured to determine the amount of the light emitted by the illumination unit based on a maximum value of the signal outputted from the photodetection unit while the illumination unit does not emit the light.

\* \* \* \* \*